United States Patent [19]

La Tona

[11] Patent Number: 5,320,862
[45] Date of Patent: Jun. 14, 1994

[54] EDIBLE, MULTIPURPOSE FLAVORED OIL SUBSTANTIALLY FREE OF FLAVORING AGENT PARTICLES

[76] Inventor: Maria E. La Tona, 25 Cleveland Ave., Bricktown, N.J. 08724

[21] Appl. No.: 939,113

[22] Filed: Sep. 2, 1992

[51] Int. Cl.$^5$ .............................................. A23D 9/00
[52] U.S. Cl. ........................................ 426/650; 426/613
[58] Field of Search ............... 426/650, 651, 607, 613, 426/438, 330.6

[56] References Cited

U.S. PATENT DOCUMENTS

| | | | |
|---|---|---|---|
| 3,663,236 | 5/1972 | Holloway | 426/612 |
| 3,860,734 | 1/1975 | Huth et al. | 426/369 |
| 4,283,429 | 8/1981 | Todd, Jr. et al. | 426/250 |
| 4,284,657 | 8/1981 | Stanton | 426/651 |
| 4,285,981 | 8/1981 | Todd, Jr. et al. | 426/250 |
| 4,343,823 | 8/1982 | Todd, Jr. et al. | 426/250 |
| 4,363,823 | 12/1982 | Kimura | 426/438 |
| 4,384,008 | 5/1983 | Millisor | 426/613 |
| 4,409,257 | 10/1983 | Deline | 426/651 |
| 4,451,493 | 5/1984 | Miller | 426/602 |
| 4,681,769 | 7/1987 | Bennett | 426/651 |
| 4,684,532 | 8/1987 | Izzo | 426/533 |
| 5,013,574 | 5/1991 | Hassel | 426/651 |
| 5,047,251 | 9/1991 | Spencer | 426/651 |
| 5,068,115 | 11/1991 | Liebermann | 426/438 |
| 5,073,398 | 12/1991 | Kuss | 426/650 |
| 5,079,017 | 1/1992 | Chen | 426/650 |
| 5,087,458 | 2/1992 | Witkewitz | 426/651 |

OTHER PUBLICATIONS

Oil Flavoured With Herbs By "Soleillou".

Primary Examiner—Carolyn Paden
Attorney, Agent, or Firm—Morgan & Finnegan

[57] ABSTRACT

This invention relates to a novel method for preparing a pre-flavored oil substantially free of flavoring agent in a particulate form. In accordance with the method of this invention, a vegetable or nut oil is contacted with a garlic or onion flavoring agent in a particulate form at a temperature between 100° C. and 200° C. for a time period between 15 minutes to 90 minutes, the weight ratio of oil to flavoring agent being 0.5 to 5 grams of oil to 1 gram of flavoring agent. After this heating period flavoring agent in particulate form is removed from the oil.

21 Claims, No Drawings

EDIBLE, MULTIPURPOSE FLAVORED OIL SUBSTANTIALLY FREE OF FLAVORING AGENT PARTICLES

BACKGROUND OF THE INVENTION

1. Field of the Invention

The present invention relates food products, more particularly to edible flavored liquid oils.

2. Description of the Related Art

Two frequently used flavoring agents are garlic and onion, both of which are members of the lily family. The odor characteristic of each results from derivatives of the amino acid cysteine. The flavor of the onion bulb resides in what is termed onion oil, a sharp-odored yellow liquid, the main component of which is allyl propyl disulfide. Onions contain methyl- and propyl-L-cysteine sulfoxide but little of the allyl form, and a sulfoxide lyase which converts these compounds to dimethyl, dipropyl and methylpropyl thiosulfinates, which are unstable and decompose even further. The characteristic onion-odor is associated with the dipropyl derivative. Stronger onions have higher ratios of propyl to methyl derivatives than milder onions. When the cells are damaged by slicing, crushing, mincing or chewing, the enzyme cysteine sulfoxide lyase converts propenyl-L-cysteine sulfoxide to either thiopropanal sulfoxide, which has been identified as the lachrymator in freshly cut onion tissue. Helen Charley, Food Science 506–508 MacMillan Publ. Co., N.Y.) (2d Ed. 1986) The garlic flavor resides in what is termed garlic oil, which is obtained from steam distillation of garlic. Garlic oilcontains a mixture of terpenes and organic sulfides, including allyl-L-cysteine sulfoxide, or alliin, and the enzyme allinase or cysteine sulfoxide lyasze, which converts ally-L-cysteine sulfoxide to ammonia, pyrovic acid and diallyl thiosulfinate, or allaicin. The last is unstable and decomposes to form diallyl disulfide, the main constituent in garlic odor. The conversion occurs when the cells are damaged by slicing, crushing, mincing or chewing. Id.

Garlic is a controversial flavoring agent; as an herb with a strong and distinctive flavor, it imparts its well-known characteristic flavor to any food with which it is prepared. The flavor is so distinctive that it evokes widely varying individual reactions; it is tolerated by some in small amounts, well-liked by others even in large amounts or intensely disliked. The wide range of tolerance or preference for garlic flavor makes it difficult for a cook to judge how much garlic is appropriate for a particular audience. Fresh garlic is also known to cause an aftertaste. This is thought to result from the volatile garlic flavor being released as a result of chewing and being "burped" up after the meal.

Onion is a less controversial ingredient and is more favorably received than garlic but also has some drawbacks. Onion has extremely volatile flavoring agents which cause eye irritation and stinging. For this reason, many cooks do not like to cut or slice onions. Numerous tricks have been employed to prevent eye tearing while cutting onions—holding the onion under running water, boiling the onion for about 10 seconds and chilling it prior to working with it, using a closed chopping device or special grater designed to contain the volatile agent. Onions also have a lingering odor, which may be gotten rid of with lemon juice, salt, vinegar or rubbing powdered mustard.

Fresh garlic is also perceived as undesirable to work with, as it imparts its distinctive flavor to the porous surfaces of utensils, bowls and the like which come into contact with garlic. Wooden surfaces are especially prone to absorbing garlic flavor, and use of the same utensils to prepare subsequent dishes inadvertently flavors these dishes with garlic. This problem presents the cook with a few options; to continue using the same utensils and tolerating the garlic flavor, to buy a separate set of utensils to use with garlic only, or to prepare garlic-flavored foods with non-porous utensils. Preparation of consistently-flavored small quantities of foods is difficult using traditional flavoring methods. Garlic, for example, is available in cloves, but a single clove is often too much garlic for a single dish, either in terms of the amount prepared or in terms of the amount of flavor desired. The clove may be halved, but this leads to waste and imprecision in measuring.

Variability in the strength of these two flavoring agents also presents difficulties. Some garlic cloves have stronger flavor due to growing conditions and/or individual characteristics of the garlic. The same is true of onions. Recipes also call for one small onion or a clove of garlic; the size of each can vary tremendously. The variation results in the uncertainty as to the resulting flavor of the food.

Another drawback with working with both garlic and onion is that if the food is cooked with these flavoring agents, there is no practical way of adding additional onion or garlic flavor subsequently after the food is cooked or by those who prefer a stronger flavor. This results in a certain amount of guesswork as to the final flavor of the food. Nor is there a satisfactory way for these flavors to be added "to taste" at the table by those who prefer a stronger flavor.

Another drawback of the traditional methods of flavoring with garlic is that as the garlic flavor seeps out of the garlic clove gradually. If heated, the flavoring occurs faster. Therefore, the flavoring process itself is unpredictable and may result in food either overflavored or insufficiently flavored. In addition, over time, the flavor may also change, often getting stronger.

Another concern raised by traditional flavoring methods of garlic flavoring is impact of garlic pieces remaining in the food. In some cases, such as the preparation of a garlic-flavored salad dressing, the presence of a piece of garlic is undesirable, either from an aesthetic point of view or culinary perspective, as a sudden burst of garlic flavor may temporarily overwhelm the food.

One approach to avoid these drawbacks is to use dried onion or garlic as a flavoring agent. This option is not entirely successful as the drying process causes the flavor to deteriorates and provides inferior, often described as rancid, flavor.

Both garlic and onion are available as salts, but these are unsatisfactory both in terms of flavor and if dietary salt is a concern.

A traditional approach to flavoring foods with garlic is to prepare garlic butter, which is made by boiling a few cloves of garlic for about five minutes, crushing the garlic in a mortar and then mixing the butter in with the crushed garlic (Rombauer, I. S. and Becker, M. R., *Joy of Cooking*, The Bobbs-Merrill Co., Inc., Indianapolis (1975), 351). Garlic butter may also be made by crushing garlic cloves as finely as possible using a mortar and pestle, and blending the garlic with the butter. (*La Cuisine. The Complete Book of French Cooking*, eds. Letoile, V.-A., Maine, M. and Peter, M., Galley Press, New York (1985), 112). The disadvantage of such an approach is that butter itself is prone to rancidity and thus is not really a suitable medium for long-term use. Unless heated, butter is semi-hard and is not as easily or as accurately measured as liquids. In addition, garlic particles alter the consistency of the butter and result in uneven distribution of garlic flavor within the butter.

Flavored oils are convenient means to flavor foods and are useful as condiments or cooking ingredients. As a liquid, oils are easily measured, mix readily and distribute their flavor more evenly in a dish than a solid flavoring agent.

As a condiment, flavored oil may be used at the table to add flavor to pasta, meat, fish, chicken, pizza or other dishes or, as an ingredient. Pre-flavored oils are useful as marinade and obviate the need to purchase the flavoring agent, which is especially desirable if the flavoring agent is only available in large quantities, such as garlic, in relation to the amount required to prepare a single dish.

Flavored oils have been prepared by prior extraction of the essential flavoring agent such as black pepper to form an herb essence as described in U.S. Pat. No. 3,860,734, which may be subsequently added to oil. This approach is time consuming, requires many steps and special equipment, uses of undesirable chemicals in the extraction process and exposes the volatile flavoring agents to air. Exposure to oxygen and other chemicals may oxidize the flavoring agent or otherwise affect the flavor. Resulting losses or deterioration of the garlic flavor must be compensated for by using larger qualities of garlic, leading to higher cost and waste.

Flavored oils have also been prepared by adding the flavoring agent directly to the oil and leaving the flavoring agent in the oil. For example, pesto, a basil sauce, is prepared by crushing approximately 1 ½ cups fresh basil leaves, two cloves of garlic, and ¼ cup pine nuts in a mortar to form a thick purée and adding about ¾ cup olive oil. (*La Cuisine. The Complete Book of French Cooking*, eds. Letoile, V.-A., Maine, M. and Peter, M., Galley Press, New York (1985), 112). Leaving the flavoring ingredients in the oil results in a flavored oil of varying strength. The longer the flavoring agents are in the oil, the more flavoring is imparted, and, as a result, the stronger the flavoring over time. Flavor variability makes it difficult for use in recipes which rely on consistent strength and for the home user to assess the strength unless the oil is tested prior to each use.

SUMMARY OF THE INVENTION

The present invention is a flavored oil, substantially free of flavoring agent particles, made by contacting the flavoring agent with a mild-flavored oil at a temperature between 100° C. and 200° C. for a time period between 15 minutes to 90 minutes and removing the flavoring agent from the oil, where oil is a vegetable oil or nut oil, the weight ratio of oil to flavoring agent being 0.5 to 5 grams of oil to 1 gram flavoring agent, and the flavoring agent is garlic or onion.

One object of the flavored oil is to expedite food preparation. Another object of the invention is to obviate the purchase of the flavoring agent or to work with the flavoring agent. Another object of the invention is to produce a flavored oil which is substantially free of flavoring agent particles. Still another object of the invention is to produce a flavored oil which will not cause a garlic or onion "aftertaste". Yet another object of the invention is to produce flavored oil in which the flavor is uniformly distributed. Still another object of the invention to produce a flavored oil in which the flavor does not increase over time. Yet another object of the invention is to provide an easy means to accurately add a predetermined amount of flavor. Another object of the invention is to provide an easily prepared flavored oil. An object of the invention is to minimize exposure of the volatile flavoring components in the flavoring agents to chemicals, including oxygen.

DETAILED DESCRIPTION OF THE INVENTION

The present invention enables easy preparation of flavored oil, the flavor of which will not increase with time.

Flavored oils avoid the lingering odors associated with garlic and onions and are a convenient way to accurately add the desired flavor to dishes.

The flavored oil of the invention also does not contain particles of the flavoring agent, therefore does not alter the consistency of any food prepared with the flavored oil. The absence of flavoring agents also prevents the unpleasantness of getting a sudden burst of strong garlic or onion flavor when the food is eaten. Removal of the flavoring agent from the oil is also thought to prevent the unpleasant aftertaste of onion or garlic. Aftertaste is thought to occur due to release of volatile flavoring agents from the particles while in the stomach. The absence of particles is thought to prevent such an event.

Suitable oils for use in the instant invention are edible, mild or bland flavored vegetable or nut oils and include, but are not limited to, corn oil, olive oil, grape seed oil, groundnut oil, peanut oil, almond oil, coconut oil, palm oil, cottonseed oil, rape seed oil, safflower oil, soybean oil and sunflower oil and other mild or neutrally flavored oil. The oils may be of a single variety or a blend of any of these or other bland oils. The oils of the present invention may be virgin oils or processed to remove undesirable characteristics. The oil must not have too strong a flavor which would overpower additional flavoring agents such as lemon or other herbs like thyme, rosemary, dill, oregano, clove, ginger, clove, coriander, nutmeg, sage and others known to those skilled in the art.

As used herein, flavoring agent is an Allium plant. The preferred Allium plants are onion and garlic.

Onion, as used herein, is a bulbous Allium plant. The preferred onions are those with strong, pungent flavors, particularly of the cepa varieties. It is preferred that the bulb part of the plant is used as the flavoring agent. The onion bulbs may be white, yellow or red. The onions may be added intact, crushed or chopped. It is preferred that the onion is chopped or crushed. Irradiated onions may also be used.

Garlic, as used herein, is a bulbous herb (*Allium sativum*) of the lily family. Also included are oriental garlic or ail (*Allium sativum*) as well as giant or topping garlic or rochambole (*Allium sorodoprasum*). Also included is wild field garlic (*Allium vineale*). The garlic bulb cloves are generally used as a flavoring agent but other parts of the plant may be used. Garlic cloves may be added intact, crushed or chopped. It is preferred that garlic is chopped or crushed. It is preferred that fresh garlic in the form of garlic cloves is used. Irradiated garlic cloves may also be used.

As used herein, the term chopped means that the flesh of the flavoring agent is cut into. The term crushed means that the interior structure of the flavoring agent has been altered so as to cause the cell walls to breakdown. Crushing is typically accomplished by applying pressure to the garlic clove or onion, but other means known to those skilled in the art may also be utilized. While not wishing to be bound by theory, it is thought that the volatile flavoring agents are more easily released into the oil when crushed or chopped into pulp or smaller particles and thus has the commercial advantage of enabling the oil to be flavored more quickly than if the flavoring agent is intact. As used herein, the term particle includes intact, chopped or crushed flavoring agent and also embraces the pulp resulting from being crushed.

One important concern in preparing food products is to ensure that the food is free of microorganism contaminants which may cause subsequent food poisoning. Of particular concern is the bacterium *Clostridium botulinum*. which secretes botulin, a deadly toxin which causes botulism. Those skilled in the art know how to process food to prevent botulism and other contaminants, and it is envisioned that such techniques may be employed herein, including the addition of suitable additives and/or preservatives. While not wishing to be bound by theory, it is also thought that the use of irradiated garlic cloves o onions will help prevent botulism. Other methods known to those skilled in the art to prevent botulism and other problems include treating the flavored oil after the particles or pulp have been removed.

The flavoring agents contain volatile oils, which are released upon exposure to air. It is preferred that the chopped or crushed onion or garlic is added to the oil promptly, in order to minimize resulting losses. It is even more preferred that the onion or garlic is chopped or crushed inside a closed system, again to minimize the loss of volatile flavoring agents. It is also preferred that the oil and flavoring agent are heated in a closed system in such a way as to minimize inadvertent loss of flavoring agents. A canning jar is a suitable closed system. The closed system may also be under vacuum. Such treatment is well-known to those skilled in the art. It is also preferred that the closed system is filled to maximum capacity with the oil and flavoring agent as much as is practicable. The term closed system is intended to include any means capable of limiting the loss of volatile flavoring agents from the oil mixture while being heated. The term also includes any means of preventing free air access ready access of oxygen to the oil mixture while being heated, such as filling the remaining space with an inert, nonhazardous gas, such as are known to those skilled in the art.

Dried garlic or onion in the form of a powder, is commercially available but is not a desirable ingredient. The flavor of dried garlic powder is generally thought inferior to that of fresh garlic and that the garlic taste deteriorates as a result of the drying process. The same is true of onion powder. However, some dried powder may be added in conjunction with the fresh flavoring agent, and if so, the amount of fresh flavoring agent used must be adjusted to compensate. If powder is added, it is preferred that less than a third of the total amount of flavoring agent is powder. A more preferred amount is less than one sixth of the total amount of flavoring agent is powder. The most preferred amount of powder is less than one tenth of the total amount of flavoring agent.

The preferred amount of flavoring agent is an amount capable of imparting a desired flavor to the oil. The amount may be adjusted if a mild or strongly flavored oil is desired and may also be adjusted due to the choice of oil used; a more strongly naturally or otherwise flavored oil will require more flavoring agent whereas a milder or blander oil will require less flavoring agent to achieve a similar flavor. In addition, the strength of the flavor may be adjusted by adding unflavored oil. The preferred weight ratio of oil to flavoring agent is 0.5 to 5 grams oil to 1 gram flavoring agent. A more preferred weight ratio of oil to flavoring agent is 0.5 to 3 grams oil to 1 gram flavoring agent. A more preferred weight ratio of oil to flavoring agent is 1 to 2 grams oil to 1 gram flavoring agent. The most preferred weight ratio of oil to flavoring agent is about 1 to 1.5 grams oil to 1 gram flavoring agent.

The preferred amount of time the flavoring agent is in contact with the oil is a time period sufficient to impart a desired flavor to the oil. The time period will depend on the ratio of oil to flavoring agent used, with less time required with lower ratios, as well as on the temperature at which the oil and flavoring agent are in contact. For example, less time is required when the temperature is high and more time required when the temperature is lower. When the oil and flavoring agent are at about boiling temperature of water, 100° C., the preferred time period is between 15 minutes to 90 minutes. A more preferred time period when at about 100° C. is between 15 minutes to 50 minutes. An even more preferred time when at about 100° C. is between 20 minutes and 45 minutes. The most preferred time, when at about 100° C. is about 30 minutes.

The temperature at which the oil and garlic are in contact may be varied from about the boiling temperature of water, 100° C. to about 200° C.; but the time period the oil and garlic are in contact will have to be increased to reflect the relatively low temperature. The temperature must be below the smoking point of the oil to prevent the deterioration of the quality of the oil. When the contact is at an elevated temperature, the time period of the contact will be reduced. The preferred temperature range for contacting the oil and garlic is 100° C. to 200° C. The more preferred temperature range is 100° C. to 150° C. A more preferred temperature range is 100° C. to 125° C. The most preferred temperature range is 100° C. to 115° C.

After a sufficient amount of the flavor has been imparted to the oil, the particles or pulp are removed by filtering or straining. The means used to remove the particles is not significant. The pore size of a filter or strainer should be sufficiently small to prevent particles or pulp from passing through. Removal may also be accomplished by decanting the oil into a separate container. A most desirable characteristic of the favored oil is that it is substantially free of particles or pulp. Remaining particles also alter the consistency of the oil. Removal of substantially all particles or pulp is also significant because remaining particles may continue to flavor the oil, thereby increasing the garlic flavor over time. The oil and flavoring agent may be allowed to cool prior to removing the particles or pulp.

The following examples are given by way of illustration only and are not to be construed as limiting the scope of the invention:

EXAMPLE 1

Preparation of Garlic Oil 250 g. chopped garlic cloves (*Allium sativum*) and 500 g. 100% corn oil were heated in a closed glass container at approximately 100° C. in a double-boiler for approximately thirty minutes. The oil was allowed to cool and the resulting oil mixture was strained to removed garlic particles. The resulting oil was opaque yellow.

EXAMPLE 2

Preparation of Garlic Mint Oil

A fish oil is prepared by heating 500 g. corn oil, 250 g. crushed garlic cloves (*Allium sativum*) and 250 g. fresh mint at approximately 100° C. in a closed glass container in a double-boiler for approximately thirty minutes. The oil is cooled and the resulting oil mixture strained to remove garlic and mint particles.

If desired, a similar oil is prepared by heating 500 g. garlic oil, prepared according to Example 2 and 250 g. fresh mint at approximately 100° C. in a closed glass container in a double boiler for approximately thirty minutes. The oil is cooled and the resulting oil is strained to remove mint particles.

EXAMPLE 3

Preparation of Onion Oil 100 g. chopped pungent onion (*Allium cepa*) and 100 g. 100% corn oil were heated in a closed glass container at approximately 100° C. in a double boiler for approximately 20 minutes. The oil was cooled and strained to remove the onion particles. The resulting oil was a clear yellow.

EXAMPLE 4

Preparation of Garlic-Onion Oil 50 g. chopped garlic (*Allium sativum*), 50 g. chopped pungent onion (*Allium cepa*) and 100 g. 100% olive oil are heated at approximately 100° C. in a closed glass container in a double-boiler for approximately 20 minutes. The oil is cooled and strained to remove the onion and garlic particles. The resulting oil is opaque yellow.

EXAMPLE 5

Preparation of White Sauce Using Onion Oil

A white sauce, or béchamel, is prepared by heating 1 tbsp 100% corn oil, 1 tbsp onion oil (as prepared according to Example 3) and 2 tbsp flour for about 3 to 5 minutes over low heat. 1 cup milk and a bay leaf is stirred in slowly. The sauce is cooked slowly until thickened.

EXAMPLE 6

Preparation of Dijonnaise Sauce Using Garlic-Onion Oil

A Dijonnaise Sauce is prepared by heating 1 cup white sauce or béchamel (as prepared according to Example 5), ¼ tsp thyme, 1 bay leaf and 1 tsp basil. In a separate pan, 1 can condensed chicken broth and 1 cup drained canned tomatoes are simmered until the total volume is approximately halved. The bay leaf is removed and the chicken broth and tomatoes are added. After the mixture is brought to a boil, the heat is turned off and 1 tbsp mustard and 2 tbsp Madeira are added.

EXAMPLE 7

Preparation of Marsala Sauce

A Marsala Sauce is prepared by mixing 16 oz. heavy cream, 3 tbsp. onion oil (as prepared in Example 3), 1 tbsp. tomato sauce, 4 tbsp. Marsala wine and ½ tsp. salt. A pinch of pepper may also be added. The mixture is heated for about three to five minutes on low heat. The resulting Marsala Sauce is suitable for meats, cutlets or scallops.

EXAMPLE 8

Preparation of Fish Sauce

A Fish Sauce is prepared by mixing 100 g. garlic oil (as prepared according to Example 1), the juice of one medium-sized lemon, ½ tsp. fresh oregano and ½ tsp. salt. Ground black pepper may be added to taste. The resulting Fish Sauce is suitable for grilled or boiled fish.

The flavored oils of the invention may be used as a seasoning agent, as a baste, as an ingredient in gravy sauces, stews, soups and the like, as well as a condiment. The above examples are not intended to limit the scope of the invention, but are merely intended as further demonstrating the utility of the invention.

What is claimed is:

1. A method for preparing a pre-flavored oil substantially free of flavoring agent in particulate form, said method comprising contacting a garlic or onion flavoring agent in a particulate form with a vegetable or nut-oil at a temperature between 100° C. and 200° C. for a time period between 15 minutes to 90 minutes, the weight ratio of oil to flavoring agent being 0.5 to 5 grams oil to 1 gram and then removing the flavoring agent in particulate form from the oil.

2. The method according to claim 1, wherein the flavoring agent is crushed or chopped prior to contacting with the oil.

3. The method according to claim 2, wherein the oil is selected from the group consisting of corn oil, olive oil, grape seed oil, groundnut oil, peanut oil, almond oil, coconut oil, palm oil, cottonseed oil, rape seed oil, safflower oil, soybean oil and sunflower oil.

4. The method according to claim 3, wherein the oil is corn oil or olive oil.

5. The method according to claim 1, wherein the garlic is selected from the group consisting of *Allium sativum*, *Allium sorodoprasum* and *Allium vineale*.

6. The method according to claim 5, wherein the garlic is *Allium sativum*.

7. The method according to claim 1, wherein the temperature is between 100° C. and 150° C.

8. The according to claim 7, wherein the temperature is between 100° C. and 125° C.

9. The method according to claim 8, wherein the temperature is between 190° C. and 115° C.

10. The method according to claim 9, wherein the oil is corn oil or olive oil, the garlic is *Allium sativum*, the garlic is crushed or chopped prior to contacting with the oil, and the oil and garlic are in contact in a closed system.

11. The method according to claim 9, wherein the time period is between 15 minutes to 50 minutes.

12. The method according to claim 11, wherein the time period is between 25 minutes to 45 minutes.

13. The method according to claim 12, wherein the time period is about 30 minutes.

14. The method according to claim 13, wherein the weight ratio of oil to flavoring agent being 1 to 2 grams oil to 1 gram flavoring agent.

15. The method according to claim 1, wherein the weight ratio of oil to flavoring agent being 0.5 to 3 grams oil to 1 gram flavoring agent.

16. The method according to claim 15, wherein the weight ratio of oil to flavoring agent being 1 to 1.5 grams oil to 1 gram flavoring agent.

17. The method according to claim 1, wherein the oil is olive oil, the flavoring agent is garlic, the garlic is *Allium sativum*, the oil and garlic are in contact at a temperature between 100° C. and 115° C. for a time period between 20 minutes to 45 minutes, and the weight ratio of oil to garlic being about 0.5 to 3 grams oil to 1 gram garlic.

18. The method according to claim 1, wherein the oil is corn oil, the flavoring agent is garlic the garlic is *Allium sativum*, the oil and garlic are in contact at a temperature between 100° C. and 115° C. for a time period ranging between 20 minutes to 45 minutes, and the weight ratio of oil to garlic being about 0.5 to 3 grams oil to 1 gram garlic.

19. The method according to claim 1, wherein the oil is olive oil, the flavoring agent is onion, the onion and oil are in contact at a temperature between 100° C. and 115° C. for a time period ranging between 20 minutes and 45 minutes and the weight ratio of oil to onion being about 0.5 to 3 grams oil to 1 gram onion.

20. The method according to claim 1, wherein the oil is corn oil, the flavoring agent is onion, the onion and oil are in contact at a temperature between 100° C. and 115° C. for a time period ranging between 20 minutes and 45 minutes, and the weight ratio of oil to onion being about 0.5 to 3 grams oil to 1 gram onion.

21. The onion or garlic flavored method prepared in accordance with the method of claim 1.

* * * * *

UNITED STATES PATENT AND TRADEMARK OFFICE
CERTIFICATE OF CORRECTION

PATENT NO. : 5,320,862
DATED : June 14, 1994
INVENTOR(S) : Maria E. La Tona

It is certified that error appears in the above-indentified patent and that said Letters Patent is hereby corrected as shown below:

Column 5, line 29, "o" should read -- or --.
Column 8, line 2,
Claim 9, "190°C" should read -- 100°C --.

Signed and Sealed this

Twenty-seventh Day of September, 1994

Attest:

BRUCE LEHMAN

*Attesting Officer*     *Commissioner of Patents and Trademarks*